United States Patent
Depestel et al.

(10) Patent No.: US 11,525,940 B2
(45) Date of Patent: Dec. 13, 2022

(54) CONTROLLER FOR AN AGRICULTURAL MACHINE

(71) Applicant: CNH Industrial America LLC, New Holland, PA (US)

(72) Inventors: Bernard E. D. Depestel, Oedelem (BE); Dirk J. Desnijder, Wondelgem (BE); Pieter Vanysacker, Moere (BE); Didier Verhaeghe, Ypres (BE); Dries Compernol, Oedelem (BE)

(73) Assignee: CNH Industrial America LLC, New Holland, PA (US)

( * ) Notice: Subject to any disclaimer, the term of this patent is extended or adjusted under 35 U.S.C. 154(b) by 491 days.

(21) Appl. No.: 16/496,766

(22) PCT Filed: Mar. 16, 2018

(86) PCT No.: PCT/EP2018/056674
§ 371 (c)(1),
(2) Date: Sep. 23, 2019

(87) PCT Pub. No.: WO2018/172210
PCT Pub. Date: Sep. 27, 2018

(65) Prior Publication Data
US 2021/0109249 A1    Apr. 15, 2021

(30) Foreign Application Priority Data
Mar. 21, 2017    (BE) .................................. 2017/5174

(51) Int. Cl.
*G01V 9/00*    (2006.01)
*A01D 89/00*    (2006.01)
(Continued)

(52) U.S. Cl.
CPC ............. *G01V 9/00* (2013.01); *A01D 89/008* (2013.01); *G01L 5/0061* (2013.01); *A01D 75/18* (2013.01)

(58) Field of Classification Search
CPC ...... G01V 9/00; A01D 89/008; A01D 75/187; A01D 41/1271; A01D 75/18; G01L 5/0061
(Continued)

(56) References Cited

U.S. PATENT DOCUMENTS

| 6,324,822 | B1 * | 12/2001 | Oliva | A01D 75/187 |
| | | | | 56/10.2 J |
| 7,874,133 | B2 * | 1/2011 | Depestel | A01D 43/107 |
| | | | | 56/16.5 |

(Continued)

FOREIGN PATENT DOCUMENTS

| DE | 4129113 A1 | 3/1993 | |
| DE | 4301611 C2 * | 7/2003 | ............. A01D 75/18 |

(Continued)

OTHER PUBLICATIONS

PCT International Search Report for PCT application PCT/EP2018/056674, dated May 29, 2018 (13 pages).

*Primary Examiner* — Octavia Davis Hollington
(74) *Attorney, Agent, or Firm* — Peter K. Zacharias; Patrick M. Sheldrake

(57) ABSTRACT

A controller for detecting an unwanted object in an agricultural machine. The agricultural machine includes a pair of rollers for receiving crop material therebetween. The pair of rollers define a variable roller opening therebetween. The controller is configured to: receive a roller-opening-value that is representative of the size of the roller opening; determine a strength-value based on the roller-opening-value and a roller-speed-value, wherein the roller-speed-value is representative of the rate of change of the roller- (Continued)

opening-value, with respect to time; compare the strength-value with a threshold-value; and if the strength-value exceeds the threshold-value, then provide an output signal that is indicative of an unwanted object being detected.

12 Claims, 3 Drawing Sheets

(51) Int. Cl.
  *G01L 5/00* (2006.01)
  *A01D 75/18* (2006.01)
(58) Field of Classification Search
  USPC ..................................................... 73/862.55
  See application file for complete search history.

(56) References Cited

U.S. PATENT DOCUMENTS

| | | | |
|---|---|---|---|
| 9,642,311 B2 * | 5/2017 | Posselius | A01F 15/10 |
| 2003/0115846 A1 * | 6/2003 | Duncan | A01F 29/16 |
| | | | 56/10.2 J |
| 2008/0078153 A1 | 4/2008 | Schafer | |

FOREIGN PATENT DOCUMENTS

| | | | | |
|---|---|---|---|---|
| EP | 2946652 A1 | 11/2015 | | |
| EP | 3563663 A1 * | 11/2019 | ........... | A01F 15/042 |
| EP | 3845053 A1 * | 7/2021 | | |

\* cited by examiner

CONTROLLER FOR AN AGRICULTURAL MACHINE

BACKGROUND OF THE INVENTION

Some components in agricultural machines, such as cutting drums in forage harvesters, can be damaged if they are exposed to a stone or other unwanted object during use of the agricultural machine. Therefore, detecting such a stone or unwanted object before it is provided to such components can enable remedial action to be taken such that the component is not damaged.

US 2008/0078153 A1 (Schafer) discloses a foreign body detector for an agricultural harvester. The foreign body detector includes a sensing element fitted such that it is movable transversely to a direction of conveyance of a crop, and an evaluation circuit, which can be operated to calculate the velocity or acceleration of the sensing element and, for the purpose of generating a signal value indicating the presence of a foreign body, to make a comparison with a threshold value.

US 2003/0115846 A1 (Duncan) discloses a foreign object detector. When a foreign object is forced through displaceable rolls in a feed mechanism of a forage harvester, the acceleration of the rolls' displacement exceeds a predetermined threshold and the detector stops the feed mechanism.

U.S. Pat. No. 6,324,822 B1 (Olivia) discloses a method of detecting foreign objects in a harvesting machine. A stone in a crop stream is detected by continuously producing an output corresponding to the transverse deflection of the one conveyor element per unit of time, continuously monitoring the feed velocity and producing an output corresponding to actual feed velocity, and establishing for the predetermined feed velocity a predetermined threshold value for the transverse-deflection output. Action-sounding an alarm, stopping the machine, and/or ejecting the stone—is taken when the transverse-deflection output exceeds the threshold value for the respective actual feed velocity.

SUMMARY OF THE INVENTION

According to a first aspect of the invention there is provided a controller for detecting an unwanted object in an agricultural machine, wherein the agricultural machine includes a pair of rollers for receiving crop material therebetween, the pair of rollers defining a variable roller opening therebetween, wherein the controller is configured to:
  receive a roller-opening-value that is representative of the size of the roller opening;
  determine a strength-value based on the roller-opening-value and a roller-speed-value, wherein the roller-speed-value is representative of the rate of change of the roller-opening-value, with respect to time;
  compare the strength-value with a threshold-value; and if the strength-value exceeds the threshold-value, then provide an output signal that is indicative of an unwanted object being detected.

Using the strength-value, which is based on both the roller-opening-value and the roller-speed-value, to provide an output signal that is indicative of an unwanted object being detected, can advantageously improve the reliability of the detection of the unwanted object.

The controller may be configured to determine the strength-value based on a maximum-roller-opening-value and the roller-speed-value. The maximum-roller-opening-value may be the maximum value of the roller-opening-value in a preceding window of time.

The controller may be configured to determine the strength-value based on the roller-opening-value and a maximum-magnitude-roller-speed-value. The maximum-magnitude-roller-speed-value may be the highest magnitude of the roller-speed-value in a preceding window of time.

The strength-value may comprise an opening-strength-value. The threshold-value may comprise an opening-threshold. The controller may be configured to: determine the opening-strength-value based on the roller-opening-value and a maximum-positive-roller-speed-value. The maximum-positive-roller-speed-value may be the highest positive value of the roller-speed-value in a preceding window of time. The controller may be further configured to: compare the opening-strength-value with the opening-threshold; and if the opening-strength-value exceeds the opening-threshold, then provide the output signal that is indicative of an unwanted object being detected.

The strength-value may comprise a closing-strength-value. The threshold-value may comprise a closing-threshold. The controller may be configured to: determine the closing-strength-value based on the roller-opening-value and a maximum-negative-roller-speed-value. The maximum-roller-negative-speed-value may be the largest negative value of the roller-speed-value in a preceding window of time (238). The controller may be further configured to: compare the closing-strength-value with the closing-threshold; and if the closing-strength-value exceeds the closing-threshold, then provide the output signal that is indicative of an unwanted object being detected.

The strength-value may comprise an opening-strength-value. The threshold-value may comprise an opening-threshold. The controller may be configured to: determine the opening-strength-value based on the roller-opening-value and a maximum-positive-roller-speed-value; determine a closing-strength-value based on a roller-opening-value and a maximum-negative-roller-speed-value; compare the opening-strength-value with the opening-threshold; and compare the closing-strength-value with a closing-threshold; and if: (i) the opening-strength-value exceeds the opening-threshold; and (ii) the closing-strength-value exceeds the closing-threshold, then provide the output signal that is indicative of an unwanted object being detected.

The controller may be configured to:
  determine a maximum-magnitude-roller-speed-value as the highest magnitude of the roller-speed-value in a preceding window of time; and
  if (i) the strength-value exceeds the threshold-value, and (ii) the maximum-positive-roller-speed-value exceeds a speed-threshold-value, then provide an output signal that is indicative of an unwanted object being detected.

The controller may be configured to:
  receive (i) an operating-characteristic-signal that is representative of an operating characteristic of the agricultural machine and/or (ii) a crop-characteristic-signal that is representative of a crop characteristic of the crop material that is to be harvested; and
  set a sensitivity of the controller for providing the output signal that is indicative of an unwanted object being detected, based on the operating-characteristic-signal and/or the crop-characteristic-signal.

The controller may be configured to set the threshold-value in order to set the sensitivity of the controller.

The controller may be configured to:
set a scaling-factor based on the operating-characteristic-signal and/or the crop-characteristic-signal, in order to set the sensitivity of the controller; and
determine the strength-value by applying the scaling-factor to the roller-opening-value and/or the roller-speed-value.

The controller may be configured to set the sensitivity as a value that is in an auto-sensitivity-range, which represents a subset of a maximum range of sensitivities that can be applied.

The controller may be configured to:
process a plurality of roller-opening-values to determine an average-roller-movement that is representative of an average amount of roller movement over a period of time; and
set a sensitivity of the controller based on the average-roller-movement.

The controller may be configured to:
receive a detection-count-value that is representative of the number of detections that occur in a preceding period of time; and
set a sensitivity of the controller based on the detection-count-value.

The controller may be configured to:
receive a manual-sensitivity-change-signal that is representative of operator input; and
decrease the sensitivity of the controller based on the manual-sensitivity-change-signal.

There may be provided a system for an agricultural machine, comprising:
any controller disclosed herein; and
an angle sensor that is associated with a non-driven end of one of the pair of rollers, wherein the angle sensor is configured to provide an angle-signal that is indicative of the size of the roller opening, and
wherein the controller is configured to process the angle-signal in order to determine the roller-opening-value and/or the roller-speed-value.

There may be provided a method for detecting an unwanted object in an agricultural machine, wherein the machine includes a pair of rollers for receiving crop material when the agricultural machine is in use, the pair of rollers defining a variable roller opening therebetween, the method comprising:
receiving a roller-opening-value that is representative of the size of the roller opening;
determining a strength-value based on the roller-opening-value and a roller-speed-value, wherein the roller-speed-value is representative of the rate of change of the roller-opening-value, with respect to time;
comparing the strength-value with a threshold-value; and
if the strength-value exceeds the threshold-value, then provide an output signal that is indicative of an unwanted object being detected.

There may be provided a computer program, which when run on a computer, causes the computer to configure any apparatus, including a controller, processor, machine, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples.

The computer program may be provided on a computer readable medium, which may be a physical computer readable medium such as a disc or a memory device, or may be embodied as a transient signal. Such a transient signal may be a network download, including an internet download.

BRIEF DESCRIPTION OF THE DRAWINGS

Embodiments of the present invention will now be described by way of example and with reference to the accompanying drawings in which.

DETAILED DESCRIPTION OF THE DRAWINGS

Figure 1:
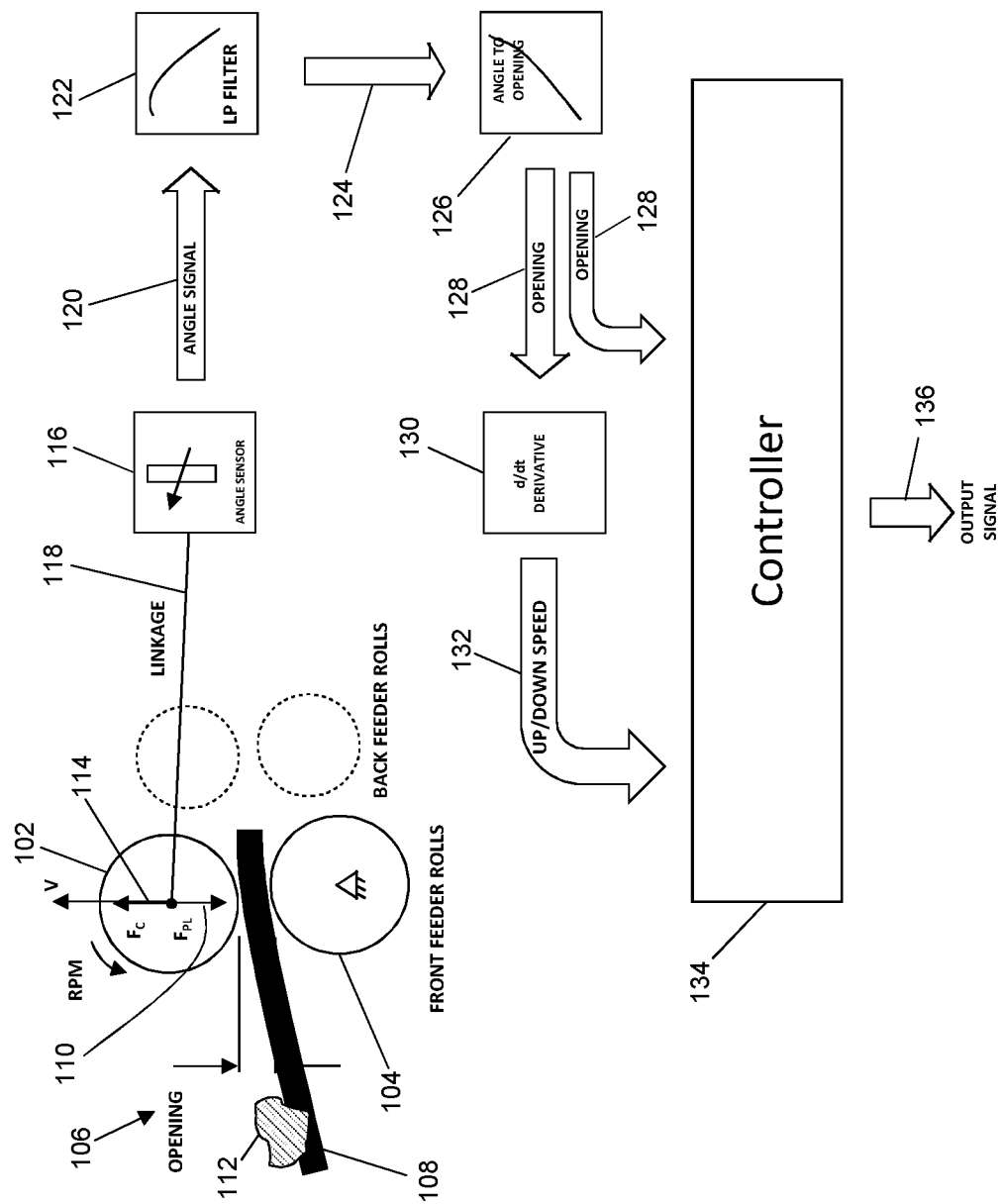
FIG. 1 shows a pair of rollers that are part of an agricultural machine, and an associated controller for detecting an unwanted object in the agricultural machine.

FIG. 1 shows a pair of rollers 102, 104 that are part of an agricultural machine. The agricultural machine may be a forage harvester, for example, that is used to harvest crop material 108 that has been laid down in a field as swath. As it is shown in FIG. 1, the rollers 102, 104 are part of an agricultural vehicle that is moving from right to left to collect the crop material 108.

The pair of rollers includes a top roller 102 and a bottom roller 104, which have longitudinal directions that are parallel to each other. The longitudinal direction of the rollers 102, 104 extend into the page, as it is shown in FIG. 1. The pair of rollers define a roller opening 106 therebetween. The roller opening 106 can be considered as the gap between outer surfaces of the two rollers 102, 104 in a direction that is perpendicular to the longitudinal directions of the rollers 102, 104. As it is shown in FIG. 1, the size of the roller opening 108 has a size that corresponds to the distance between the outer surfaces of the two rollers 102, 104 along a straight line between the centres of the two rollers 102, 104.

When the agricultural machine is in use, crop material 108 passes through the roller opening 106 between the top roller 102 and the bottom roller 104 such that the rollers 102, 104 rotate in opposite directions. The pair of rollers 102, 104 can rotate with a certain RPM (revolutions per minute) and pull the crop material 108 into the agricultural machine.

In this example the top roller 102 is movable relative to the bottom roller 104 such that the size of the roller opening 106 is variable. (In some examples, the bottom roller 104 can also be, or is instead, movable relative to the top roller 102.) For example, the top roller 102 may have an axle 102 that is mounted within a longitudinal slot, such that the axle can move along the slot in response to forces exerted on the top roller 102. As it is shown in FIG. 1, the top roller 102 is moveable up and down, either away from or towards the bottom roller 104.

The top roller 102 is pushed down, towards the bottom roller 104, by a preload-force $F_{PL}$ 110. In this way, the top roller 102 is biased to reduce the size of the roller opening 108. This preload-force $F_{PL}$ 110 can be generated by a spring for example, or any other component that is known in the art. The incoming crop material 108, along with any other objects such as stones 112, that passes through the roller opening 106 exert an upwards crop-force $F_C$ 114 on the top roller 102. The upwards crop-force $F_C$ 114 is shown in the direction that the top roller 102 is capable of moving due to the crop-force $F_C$ 114. The crop-force $F_C$ 114 is in the opposite direction to the preload-force $F_{PL}$ 110.

If the net result of the crop-force $F_C$ 114 and the preload-force $F_{PL}$ 110 is not zero, then the top roller 102 moves vertically (either up or down) relative to the bottom roller 104 with a speed v. As will be discussed below, one or more of the examples disclosed herein can advantageously use both (i) a roller-opening-value that is representative of the size of the roller opening 108 between the pair of rollers 102, 104; and (ii) a roller-speed-value that is representative of the rate of change of the roller-opening-value, with respect to time, in order to detect that a stone 112 (or other unwanted object) is passing between the pair of rollers 102, 104. This detection can then be used to automatically shut down the agricultural machine, for example, to protect downstream processing components of the agricultural machine from the stone 112. For instance, a downstream cutter drum could be significantly damaged if a stone 112 were allowed to pass through the pair of rollers 102, 104.

In this example, the pair of rollers 102, 104 are a pair of front feeder rollers. In other examples, the pair of rollers could be back feeder rollers, any other type of feeder rollers, conditioning rollers, or any other type of rollers.

Also shown in FIG. 1 is an angle sensor 116, which is connected to the top roller 102 by a mechanical linkage 118. As the top roller 102 moves up and down, the angle of the connection between the linkage 118 and the angle sensor 116 changes. The angle sensor 116 measures this angle, and provides an angle-signal, which is represented schematically in FIG. 1 with reference 120. In this example, an optional low-pass filter 122 is used to filter the angle-signal 120 in order to remove any high frequency noise. The low-pass filter 122 provides a filtered-angle-signal 124 as an output signal.

A processor 126 can then convert the filtered-angle-signal 124 (or the angle-signal 120 if a filter 122 has not been used) to a roller-opening-value 128. The processor 126 can use a database/look-up-table to make the conversion, or can apply a simple algorithm that is based on the length of the mechanical linkage 118. Such an algorithm is represented schematically in FIG. 1 within the processor block 126.

A processor 130 can then convert the roller-opening-value 128 into a roller-speed-value 132, by differentiating the roller-opening-value 128 with respect to time. That is, the roller-speed-value 132 represents the speed with which the top roller 102 moves away from, or towards, the bottom roller 104, not the speed with which either of the rollers 102, 104 rotate about their axes. If the roller-speed-value 132 is positive then the top roller 102 is moving away from the bottom roller 104, and if the roller-speed-value 132 is negative then the top roller 102 is moving towards the bottom roller 104.

It will be appreciated that in other examples, different types of sensor can be used to measure (directly or indirectly) the roller-opening-value 128 and the roller-speed-value 132.

The roller-opening-value 128 and the roller-speed-value 132 are provided as input signals to a controller 134 that can provide an output signal 136 that is indicative of whether or not a stone is detected.

As will be discussed in detail below, the controller 134 can determine a strength-value based on the roller-opening-value 128 and the roller-speed-value 132, and then compare the strength-value with a threshold-value. If the strength-value exceeds the threshold-value, then the controller 134 can provide an output signal 136 that is indicative of a stone being detected. It has been found that using both the roller-opening-value 128 and the roller-speed-value 132 as part of an object detection algorithm can improve the reliability of the detection.

It will be appreciated that the functionality of each of the controllers/processors described herein can be provided by a single processor/controller, or by separate processors/controllers. Any such processors/controllers can be situated locally with the agricultural machine, or remotely.

In this example, the angle sensor 116 is associated with a non-driven end of the top roller 104. That is, the top roller 104 can have: a driven end, which receives a driving force from a drive mechanism to cause it to rotate; and a non-driven end that is distal from the driven end (along the longitudinal direction of the roller). The non-driven end of the roller does not have a drive mechanism attached to it. It has been found that, since the non-driven end of the roller does not have a drive mechanism attached to it, it is lighter in weight and therefore more easily deflected by the crop material 108 that passes through the roller opening 106 between the pair of rollers 102, 104. Therefore, determining the size of the roller opening 106 using measurements associated with the non-driven end of the top roller 102, instead of the driven end of the top roller 102, can give more accurate and reliable detection of stones that pass through the pair of rollers 102, 104. In another example, angle sensors 116 can be associated with both a driven and non-driven end of the top roller 102.

The angle sensor 116 and the controller 134 can together be considered as a system for an agricultural machine.

Figure 2:
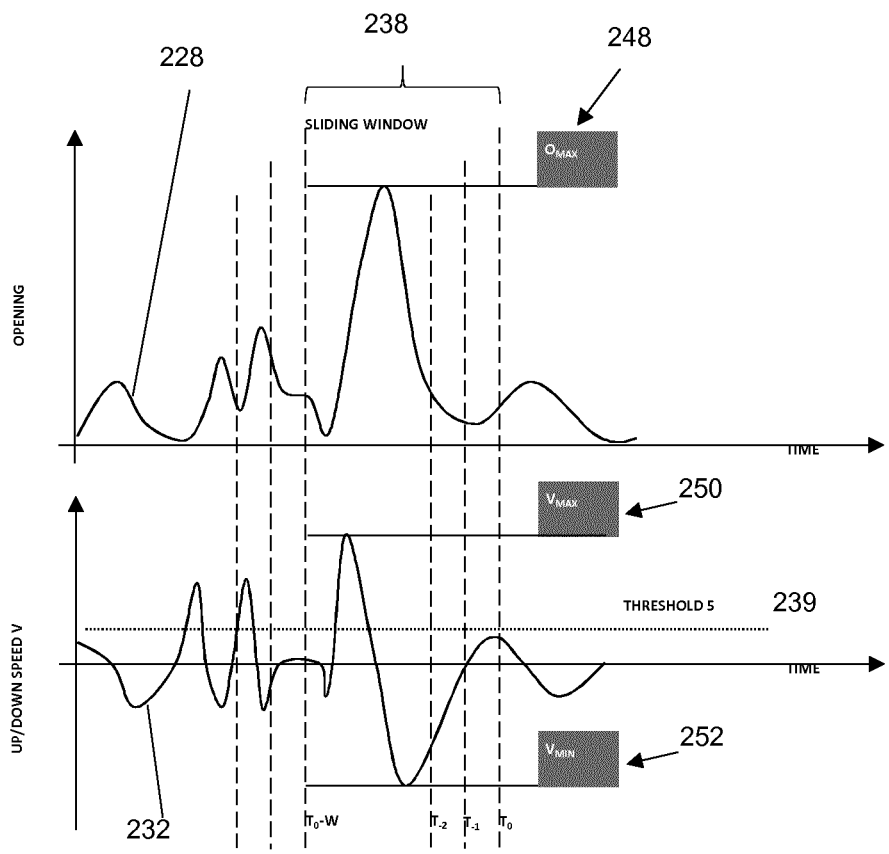
FIG. 2 shows example plots of measurements taken for a roller-opening-value and a roller-speed-value, and how these values can vary with time.

FIG. 2 shows example plots of measurements taken for a roller-opening-value 228 and a roller-speed-value 232, and how these values can vary with time.

The roller-opening-value 228 is measured/determined at a sampling rate, for example 1 kHz, that is sufficiently high that a stone passing through the rollers should not be missed. The roller-opening-values 228 and the roller-speed-values 232 that are determined over time are stored/buffered in memory in this example so that they are available as historic values for calculating the output signal. Optionally, the angle-signal values can be stored in memory instead, such that the roller-opening-values 228 and the roller-speed-values 232 can be calculated from the buffered angle-signal values.

Calculations to determine the output signal can be performed at a slower rate on the buffered data, for example every 10 ms. The calculations can be performed by a sliding window approach. That is, the output signal can be calculated using the historic values for the roller-opening-values 228 and the roller-speed-values 232 that are stored in memory, such that data representing a fixed window of time that leads up to a present moment in time is used. Then, for the next calculation at a future instant in time, the starting point of the fixed window moves on by the same amount of time that has elapsed since the previous calculation was performed. The size of the fixed window may be defined by the amount of data that is buffered in memory, and therefore is accessible to the controller. In this way, the memory can be used as a FIFO (first in, first out) buffer for storing the data that will be used to determine the output signal. Advantageously the size of the window can be at least sufficiently wide to contain both an upward movement signal and a downward movement signal of a typical stone event, at any possible roller RPM.

In one example, 1000 samples recorded at 1 kHz are buffered in memory. This results in a window 238 of 1 second. If the data processing rate is 10 Hz, then this window 238 would be shifted by 100 ms for each calculation, such that calculations are performed 10 times per second on the last 1000 samples that were recorded. In another example, the sliding window can have a width W of 300 ms at a sampling rate of 500 Hz, such that it contains 150 samples. A challenge of the algorithm is to discriminate roller movement caused by (undesired) stones from roller movement caused by (expected) crop.

In this example, the sliding window approach is used to find a maximum-roller-opening-value of the roller-opening-values 228 in the window 238. For each calculation (at each time step T), the current sample and N previous samples are considered, where N is defined by the size of the buffer. For the above numerical example, N is 1000 samples. Also, the sliding window approach is used to find a maximum-opening-speed-value and a maximum-closing-speed-value in the window. The maximum-opening-speed-value represents the largest positive value of the roller-speed-value 232 in the preceding window, because positive values for the roller-speed-value 232 represent an opening speed. Similarly, the maximum-closing-speed-value represents the largest negative value of the roller-speed-value 232 in the preceding window, because negative values for the roller-speed-value 232 represent a closing speed.

In this example, an opening-strength and a closing-strength are calculated as the product of the roller-opening-value 128 and the roller-speed-value 132. More particularly:

$$\text{opening-strength-value} = (O_{MAX})^{S1} \times V_{MAX}$$

$$\text{closing-strength-value} = (O_{MAX})^{S2} \times V_{MIN}$$

Where: $O_{MAX}$ 248 is the maximum value of the roller-opening-value in a preceding window of time; $V_{MAX}$ 250 is the highest positive value of the roller-speed-value in the preceding window of time; and $V_{MIN}$ 252 is the largest negative value of the roller-speed-value in a preceding window of time. $O_{MAX}$ may also be referred to as the maximum-roller-opening-value. $V_{MAX}$ may also be referred to as the maximum-positive-roller-speed-value. $V_{MIN}$ may also be referred to as the maximum-roller-negative-speed-value.

S1 and S2 are optional scaling-factors (S1—opening-scaling-factor; S2—closing-scaling-factor) that can be set to change the relative importance of the $O_{MAX}$, $V_{MAX}$ and $V_{MIN}$, as will be discussed in detail below. It will be appreciated that the same functionality can be achieved by applying optional scaling-factors to $V_{MAX}$ and $V_{MIN}$.

More generally, a strength-value can be based on the roller-opening-value and a maximum-magnitude-roller-speed-value, wherein the maximum-magnitude-roller-speed-value is the highest magnitude (positive or negative) of the roller-speed-value in a preceding window of time.

Figure 3:
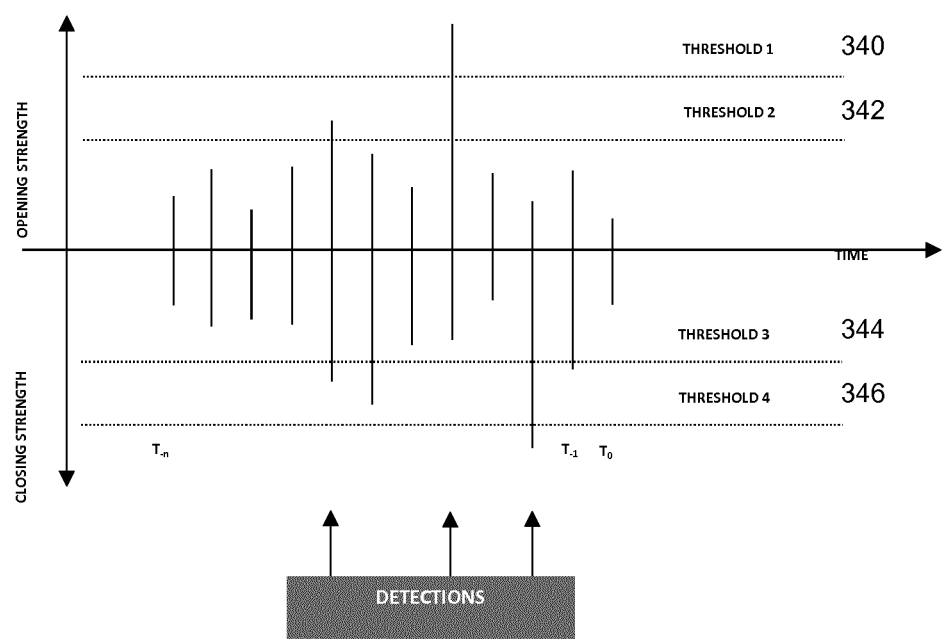
FIG. 3 shows a plot of opening-strength-value and closing-strength-value, versus time.

FIG. 3 shows a plot of opening-strength-value (positive stems, above the horizontal axis) and closing-strength-value (negative stems, below the horizontal axis), versus time on the horizontal axis. The opening-strength-values and the closing-strength-values are shown as discrete values on the time axis because they are calculated periodically according to the data processing rate, as discussed above. So, for each window that is calculated, the result is a pair of stems.

The opening-strength-values and the closing-strength-values can then be compared with one or more thresholds in order to set the output signal as indicative of whether or not a stone has been detected.

In this example, two opening-thresholds 340, 342 and two closing-thresholds 344, 346 are used. The opening-thresholds 340, 342 are positive values, and include an outer-opening-threshold 340 and an inner-opening-threshold 342. The outer-opening-threshold 340 has a higher value than the inner-opening-threshold 342. The closing-thresholds 344, 346 are negative values, and include an outer-closing-threshold 346 and an inner-closing-threshold 344. The outer-closing-threshold 346 has a higher magnitude than the inner-closing-threshold 344.

In this example, the controller can set the output signal such that it is indicative of a stone being detected if one or more of the following criteria are satisfied:

1. the opening-strength-value exceeds the outer-opening-threshold 340;
2. the closing-strength-value exceeds the outer-closing-threshold 346; and
3. (i) the opening-strength-value exceeds the inner-opening-threshold 342, and (ii) and the closing-strength-value exceeds the inner-closing-threshold 344.

In some examples, the controller may only set the output signal such that it is indicative of a stone being detected if one or more of the above three criteria are satisfied AND the maximum-positive-roller-speed-value ($V_{MAX}$) exceeds a speed-threshold-value. (An example of a speed-threshold-value is shown in FIG. 2 with reference 239.) This can improve a false detection rate associated with the system. Additionally, or alternatively, a comparison of the maximum-negative-roller-speed-value ($V_{MIN}$) with a speed-threshold-value can be used by the controller to set the output signal.

The threshold values can be tuned for optimal performance, which can be considered as one example of setting the sensitivity of the controller for providing the output signal that is indicative of an unwanted object being detected. For instance, the controller can optionally set one or more of the threshold values disclosed herein based on: an operating-characteristic-signal that is representative of an operating characteristic of the agricultural machine; and/or a crop-characteristic-signal that is representative of a crop characteristic of the crop material that is to be harvested. The controller can set the one or more threshold values using an algorithm or values in a database/look-up table, for instance. This can enable the operation of the controller/agricultural machine to advantageously be dynamically adjusted in real-time to improve performance of the agricultural machine. For instance, a false detection rate can be improved, and/or a probability that the controller will react to a stone/object can be increased. Also, a consistent detection sensitivity can be applied irrespective of how the agricultural machine is being operated (for example irrespective of how quickly the rollers are rotating).

In one example, the controller can determine, and then apply, variable threshold-multipliers to appropriate baseline thresholds to set one or more of: the outer-opening-threshold 340; the outer-closing-threshold 346; the inner-opening-threshold 342; the inner-closing-threshold 344; and the speed-threshold-value. The controller can determine such variable threshold-multipliers based on operating characteristics of the agricultural machine such as: rotational speed of the rollers (for instance in RPM); ground speed of the agricultural machine; engine load; or type of a header that is attached to the agricultural machine. The controller may also determine the variable threshold-multipliers based on crop characteristics such as crop-type (which may be information that is provided by an operator of the agricultural machine); or moisture content of the crop material. It will be appreciated that any other characteristic that is representative of the volume, speed or type of crop that is passing through the rollers can also be used. In particular, varying thresholds based on the rotational speed of the rollers can ensure that equal detection levels (in terms of sensitivity) can be applied for varying operating conditions of the agricultural machine.

Returning to the optional scaling-factors (S1 and S2) that are mentioned above. If S1 and S2 are both set as 1, then both the roller-opening-value and the roller-speed-value are given equal weight in determining the associated strength-value. If S1 or S2 is set as a value that is greater than 1, then more weight is assigned to the roller-opening-value than the roller-speed-value when determining the associated strength-value, and thus the detection can have more emphasis on the size of the foreign object. Furthermore, the controller can set the values of S1 and S2 dependent on any of the operating characteristics or crop characteristics that are identified herein. In one example, when the roller rotational speed is higher, the transient time of the moving crop will be shorter than for low roller rotational speed, resulting in higher values of the derivative part (roller-speed-value). This effect can be compensated by the controller adapting the value of S1 and/or S2 as a function of roller rotational speed, where S1 and/or S2 are increase with increasing roller rotational speed.

Also, in some examples, the controller can set the pre-load-force $F_{PL}$ that is applied to the top roller, as shown in FIG. 1. The controller can process one or of the above operating characteristics or crop characteristic and dynamically set/adjust the preload-force $F_{PL}$ accordingly. In some examples, this can be in combination with setting one or more of the threshold values that will be applied to the determined strength-values, because adjusting the preload-force $F_{PL}$ will affect when the threshold values are exceeded.

It will be appreciated that examples disclosed herein can be used with any other type of agricultural machine that has rollers for processing material.

The following description provides additional information about processing that can be performed by a controller in order to automatically change the sensitivity of a stone detector algorithm, based on measured/current working conditions, to ensure improved/optimal detection capability. For example, sensitivity can be automatically adjusted by setting one or more of the thresholds or scaling factors that are described above. In this way, a controller can set its sensitivity for providing the output signal that is indicative of an unwanted object being detected.

A stone detector algorithm that is based on processing a feeder roll opening, such as the one described above, should be as sensitive as possible, without falsely identifying a stone when the roller movement is caused by crop only. However, the effect of crop on the roller movement can differ from field to field. Therefore, the stone detector algorithm can benefit from having a different sensitivity setting for each field, to enable acceptable/optimal detection rate with acceptably low/minimum false detections. An operator may be able to set a sensitivity of the stone detector algorithm, for example using a human interface device such as a touch screen. When the operator lowers the sensitivity because conditions require it, it may well be that he doesn't increase it again for the next field, thus possibly compromising the detection capability of the system. Also, it can be difficult for an operator to gauge what the optimal sensitivity setting is, especially at the start of a harvest. Therefore, if optimal performance is to be achieved, the operator will have to change the sensitivity regularly on a trial and error basis, which in reality may not happen. Instead, the operator may settle with a low sensitivity because this will not result in many false alarms. However, there will be an increased risk of a stone (or other unwanted object) passing through the rollers undetected, and therefore also an increased risk that downstream components will be damaged by the stone.

Described below are software methods for automatic and semi-automatic adjustment of the sensitivity, based on measured/current working conditions. The method may or may not provide feedback to an operator on a display.

In one example, a controller can apply an automatic method for setting the sensitivity of a stone detection algorithm, with a view to ensuring the best possible sensitivity setting. The controller can monitor the movement of the feeder roller(s) over an averaging-period-of-time during harvesting, for example by processing a roller-opening-value. The controller can then calculate an average-roller-movement as the average amount of roller movement over the period of time. This may optionally involve applying the functionality of a low pass filter to measured values.

The controller can then compare the average-roller-movement with one or more roller-movement-thresholds. If the average-roller-movement is less than a low-roller-movement-threshold, then this can be interpreted as the overall roller movement being a small amount, such that the crop is assumed not to be aggressive. When this is the case, the controller can automatically increase the sensitivity of the stone detector algorithm, for example by decreasing one or more of an opening-threshold, a closing-threshold and a speed-threshold-value. In some instances, the controller may only automatically increase the sensitivity if the average-roller-movement is greater than a roller-movement-threshold for a predefined period of harvesting time, for example 10 minutes. When the predefined period of time has elapsed, the controller may increase the sensitivity by a predetermined-step-size. Using such gradual/step-wise control can advantageously prevent the sensitivity from being changed too quickly, which could result in the stone detector algorithm making too many false detections. In some examples, the predetermined-step-size can be hard-coded. In other examples, it can be dynamically set based on: (i) the average-roller-movement; or (ii) the difference between the average-roller-movement and the roller-movement-threshold. In this way, the sensitivity can be set to an appropriate level, according to the overall amount of roller movement that is measured.

Additionally, or alternatively, the controller may store in memory a detection-count value that is representative of the number of detections that occur in a preceding period of time. If the detection-count is less than a low-count-threshold, then the controller may automatically increase the sensitivity as set out above.

In a similar way, the controller can automatically decrease the sensitivity of the stone detector algorithm if the average-roller-movement is greater than a high-roller-movement-threshold, or if the detection-count is greater than a high-count-threshold. This may involve increasing one or more of an opening-threshold, a closing-threshold and a speed-threshold-value. In some examples, the controller may decrease the sensitivity by a predetermined-step-size. Using such gradual/step-wise control can advantageously prevent the sensitivity from being changed too quickly, which could result in the stone detector algorithm not detecting a stone passing through the rollers. This predetermined-step-size can also be hard-coded or can be dynamically set.

In some examples, the controller can cause information representative of any automatic change to be provided to the operator, for instance via a display, a permanent indicator or any other type of notification. The notification may optionally contain an interactive element, such as a "button" on a touchscreen, so that the operator can override the proposed automatic change if he wanted to. Upon receipt of such an override signal, the controller can either revert to a sensitivity level (e.g. threshold level/s) that was being applied before the automatic update, or can prevent the sensitivity level from being automatically updated. Such prevention of automatic updating may be applied by for the controller for a predetermined period of time, until the controller receives an override-cancel signal that is representative of an operator's instruction to cancel an override, or until the agricultural machine is turned off, as non-limiting examples.

In another example, a controller can apply a semi-automatic method for setting the sensitivity of a stone detection algorithm. Such a semi-automatic method can automatically increase, but not automatically decrease, the sensitivity of the stone detection algorithm over time. The controller can automatically increase the sensitivity of the stone detector algorithm using any of the examples described above. In this example, when the harvesting conditions become too aggressive and false detections do occur, the operator can manually decrease the sensitivity of the stone detection algorithm. That is, the controller can receive a manual-sensitivity-change-signal that is representative of operator input, and the controller can then decrease the sensitivity of the stone detector algorithm based on the manual-sensitivity-change-signal. The controller can continue to monitor the aggressiveness of the crop (for example by determining strength-value as discussed above), and can start to increase sensitivity again if the conditions become smoother (for example, the average-roller-movement is a low value), as explained above with reference to the automatic method for setting the sensitivity of a stone detection algorithm.

In this way, over time, the controller will automatically revert to a more sensitive setting if harvesting conditions allow, thus making good utilization of the detection capability of the stone detector algorithm. If too many false detections start to occur, then the operator can decide to lower the sensitivity again, thus making him fully responsible for a reduced stone detection performance. Each time a stone is detected, the controller can cause a notification to be provided to the operator, for example a notification can be provided on a display.

For both the automatic and the semi-automatic methods, the controller can include an interactive element with a notification that is provided to the operator, to quickly allow the operator to choose another sensitivity level without going into a menu system associated with the user input. These automatic and semi-automatic methods can operate in an auto-sensitivity-range which represents a subset of a maximum range of sensitivities that can be applied by the stone detector algorithm. For example, the controller may be configured so that it can increase sensitivity when conditions allow, but not higher than for example 80% of a maximum-sensitivity-setting. Also, the controller may automatically decrease the sensitivity, but not lower than for example 30% of the maximum-sensitivity-setting. The extreme ranges/values (greater than 80% and less than 30%) are then reserved for the operator to set manually.

In some examples, the controller can be configured to automatically adjust the sensitivity such that it satisfies a minimum-sensitivity-threshold. For example, consider a field with very bad conditions. The operator can then set the sensitivity to an extremely low setting, especially designed for extreme cases that occur in only 1% to 5% of fields. One or more of the methods disclosed herein can then be applied, starting with a sensitivity level that corresponds to this special setting. Once harvesting conditions improve (as determined by a strength-value, an operating characteristic of the agricultural machine, or a crop characteristic for example), the controller can automatically increase the sensitivity such that it returns to a normal low level, thus ensuring a minimum performance of the stone detector algorithm whenever possible. The "normal low level" may be one that falls within the auto-sensitivity-range.

For one or more of the examples disclosed herein, the controller may automatically take remedial action in response to the stone detector algorithm detecting a stone. For instance, the controller may cause the agricultural machine, or at least part of the agricultural machine to be shut down so that it is no longer operational, or so that it is operating in a different operational-mode. This can protect crop processing components that are downstream of the region in which the stone or other unwanted object is detected.

The invention claimed is:

1. A controller for detecting an unwanted object in an agricultural machine, wherein the agricultural machine includes a pair of rollers for receiving crop material therebetween, the pair of rollers defining a variable roller opening therebetween, wherein the controller is configured to:
   receive a roller-opening-value that is representative of a size of the roller opening;
   determine a strength-value based on the roller-opening-value and a roller-speed-value, wherein the roller-speed-value is representative of a rate of change of the roller-opening-value, with respect to time;
   compare the strength-value with a threshold-value; and
   if the strength-value exceeds the threshold-value, then provide an output signal that is indicative of an unwanted object being detected, wherein the controller is configured to determine the strength-value based on one of:
   a maximum-roller-opening-value and the roller-speed-value, wherein the maximum-roller-opening-value is a maximum value of the roller-opening-value in a preceding window of time; and
   the roller-opening-value and a maximum-magnitude-roller-speed-value, wherein the maximum-magnitude-roller-speed-value is a highest magnitude of the roller-speed-value in a preceding window of time.

2. The controller of claim 1, wherein the controller is configured to:
   receive (i) an operating-characteristic-signal that is representative of an operating characteristic of the agricultural machine or (ii) a crop-characteristic-signal that is representative of a crop characteristic of the crop material that is to be harvested; and
   set a sensitivity of the controller for providing the output signal that is indicative of an unwanted object being detected, based on the operating-characteristic-signal or the crop-characteristic-signal.

3. The controller of claim 2, wherein the controller is configured to set the threshold-value in order to set the sensitivity of the controller.

4. The controller of claim 2, wherein the controller is configured to:
   set a scaling-factor based on the operating-characteristic-signal or the crop-characteristic-signal, in order to set the sensitivity of the controller; and
   determine the strength-value by applying the scaling-factor to the roller-opening-value or the roller-speed-value.

5. The controller of claim 2, wherein the controller is configured to set the sensitivity as a value that is in an auto-sensitivity-range, which represents a subset of a maximum range of sensitivities that can be applied.

6. The controller of claim 1, wherein the controller is configured to:
   process a plurality of roller-opening-values to determine an average-roller-movement that is representative of an average amount of roller movement over a period of time; and
   set a sensitivity of the controller based on the average-roller-movement.

7. The controller of claim 1, wherein the controller is configured to:
   receive a detection-count-value that is representative of a number of detections that occur in a preceding period of time; and
   set a sensitivity of the controller based on the detection-count-value.

8. The controller of claim 1, wherein the controller is configured to:
   receive a manual-sensitivity-change-signal that is representative of operator input; and
   decrease a sensitivity of the controller based on the manual-sensitivity-change-signal.

9. A system for an agricultural machine, comprising:
   the controller of claim 1; and
   an angle sensor that is associated with a non-driven end of one of the pair of rollers, wherein the angle sensor is configured to provide an angle-signal that is indicative of the size of the roller opening, and
   wherein the controller is configured to process the angle-signal in order to determine the roller-opening-value and the roller-speed-value.

10. A controller for detecting an unwanted object in an agricultural machine, wherein the agricultural machine includes a pair of rollers for receiving crop material therebetween, the pair of rollers defining a variable roller opening therebetween, wherein the controller is configured to:
   receive a roller-opening-value that is representative of a size of the roller opening;
   determine a strength-value based on the roller-opening-value and a roller-speed-value, wherein the roller-speed-value is representative of a rate of change of the roller-opening-value, with respect to time;
   compare the strength-value with a threshold-value; and
   if the strength-value exceeds the threshold-value, then provide an output signal that is indicative of an unwanted object being detected, wherein the strength-value comprises an opening-strength-value, the threshold-value comprises an opening-threshold, and the controller is configured to carry out at least one of the following two sets of steps:
   set one:
      determine the opening-strength-value based on the roller-opening-value and a maximum-positive-roller-speed-value, wherein the maximum-positive-roller-speed-value is a highest positive value of the roller-speed-value in a preceding window of time;
      compare the opening-strength-value with the opening-threshold; and
      if the opening-strength-value exceeds the opening-threshold, then provide the output signal that is indicative of an unwanted object being detected; and
   set two:
      determine the opening-strength-value based on the roller-opening-value and a maximum-positive-roller-speed-value;
      determine a closing-strength-value based on a roller-opening-value and a maximum-negative-roller-speed-value;
      compare the opening-strength-value with the opening-threshold; and
      compare the closing-strength-value with a closing-threshold; and
      if: (i) the opening-strength-value exceeds the opening-threshold; and (ii) the closing-strength-value exceeds the closing-threshold, then provide the output signal that is indicative of an unwanted object being detected.

11. A controller for detecting an unwanted object in an agricultural machine, wherein the agricultural machine includes a pair of rollers for receiving crop material therebetween, the pair of rollers defining a variable roller opening therebetween, wherein the controller is configured to:
   receive a roller-opening-value that is representative of a size of the roller opening;
   determine a strength-value based on the roller-opening-value and a roller-speed-value, wherein the roller-speed-value is representative of a rate of change of the roller-opening-value, with respect to time;
   compare the strength-value with a threshold-value; and
   if the strength-value exceeds the threshold-value, then provide an output signal that is indicative of an unwanted object being detected, wherein the strength-value comprises a closing-strength-value, the threshold-value comprises a closing-threshold, and the controller is configured to:
   determine the closing-strength-value based on the roller-opening-value and a maximum-negative-roller-speed-value, wherein the maximum-roller-negative-speed-value is a largest negative value of the roller-speed-value in a preceding window of time;
   compare the closing-strength-value with the closing-threshold; and
   if the closing-strength-value exceeds the closing-threshold, then provide the output signal that is indicative of an unwanted object being detected.

12. A controller for detecting an unwanted object in an agricultural machine, wherein the agricultural machine includes a pair of rollers for receiving crop material therebetween, the pair of rollers defining a variable roller opening therebetween, wherein the controller is configured to:
   receive a roller-opening-value that is representative of a size of the roller opening;
   determine a strength-value based on the roller-opening-value and a roller-speed-value, wherein the roller-speed-value is representative of a rate of change of the roller-opening-value, with respect to time;
   compare the strength-value with a threshold-value; and
   if the strength-value exceeds the threshold-value, then provide an output signal that is indicative of an unwanted object being detected, wherein the controller is configured to:
   determine a maximum-magnitude-roller-speed-value as a highest magnitude of the roller-speed-value in a preceding window of time; and
   if (i) the strength-value exceeds the threshold-value, and (ii) the maximum-positive-roller-speed-value exceeds a speed-threshold-value, then provide an output signal that is indicative of an unwanted object being detected.

* * * * *